United States Patent [19]

Bateman

[11] Patent Number: 5,318,485
[45] Date of Patent: Jun. 7, 1994

[54] CHAIN-BELT

[75] Inventor: Paul M. Bateman, Freeville, N.Y.

[73] Assignee: Borg-Warner Automotive, Inc., Sterling Heights, Mich.

[21] Appl. No.: 950,867

[22] Filed: Sep. 24, 1992

[51] Int. Cl.$^5$ .............................................. F16G 13/08
[52] U.S. Cl. .................................... 474/245; 474/247
[58] Field of Search ............... 474/201, 206, 237, 242, 474/244, 245-247

[56] References Cited

U.S. PATENT DOCUMENTS

| | | | |
|---|---|---|---|
| 3,364,767 | 1/1968 | Bredschneider et al. | 74/236 |
| 3,720,113 | 3/1973 | VanDoorne et al. | 74/236 |
| 3,916,709 | 11/1975 | Steuer et al. | 74/253 |
| 4,313,730 | 2/1982 | Cole, Jr. et al. | 474/201 |
| 4,344,761 | 8/1982 | Steuer | 474/245 |
| 4,392,843 | 7/1983 | Smit | 474/245 |
| 4,569,671 | 2/1986 | Ledvina | 474/201 |
| 4,608,036 | 8/1986 | Dono | 474/201 |
| 4,643,704 | 2/1987 | Honda | 474/245 |
| 4,666,421 | 5/1987 | Honda | 474/242 |
| 4,710,154 | 12/1987 | Rattunde | 474/245 X |
| 4,764,158 | 8/1988 | Honda et al. | 474/212 |
| 4,936,813 | 6/1990 | Ohzono et al. | 474/242 |
| 5,007,883 | 4/1991 | Cole et al. | 474/242 |
| 5,026,332 | 6/1991 | Mott et al. | 474/242 |
| 5,061,226 | 10/1991 | Mott | 474/244 |
| 5,090,948 | 2/1992 | Orth | 474/245 |
| 5,147,250 | 9/1992 | Mott | 474/206 |
| 5,147,251 | 9/1992 | Cole | 474/206 |
| 5,167,587 | 12/1992 | Mott | 474/245 |

Primary Examiner—Ramon S. Britts
Assistant Examiner—Roger J. Schoeppel
Attorney, Agent, or Firm—Emch, Schaffer, Schaub, Dziegielewski

[57] ABSTRACT

A power transmission (10) chain-belt (32) is disclosed that is especially adaptable for connecting the pulleys or sheaves (12, 14) of a pulley transmission (10). The chain-belt (32) has a plurality of interleaved sets (34) of transversely arranged links (36). Pivot means (40) joined interleaved sets (34) of links (36) to form an endless loop. At least one toe (42a, 42b) extends from each link (36) in at least some sets (34) of links (36). The toes (42a, 42b) are in opposed relationship and define a passageway (80). A plurality of struts (50) are connected to the links (36) and are positioned in the passageway (80). Each strut (50) has edge surfaces (88) for contacting the pulleys (12, 14) of the transmission (10). Each strut (50) further includes at least one notch (52) proximate the centerline of the strut (50). Retaining links (90) are supported by the pivot means (40) for engaging the notch (52) and limiting the lateral motion of the strut (50) with respect to the set (34) of links (36).

21 Claims, 11 Drawing Sheets

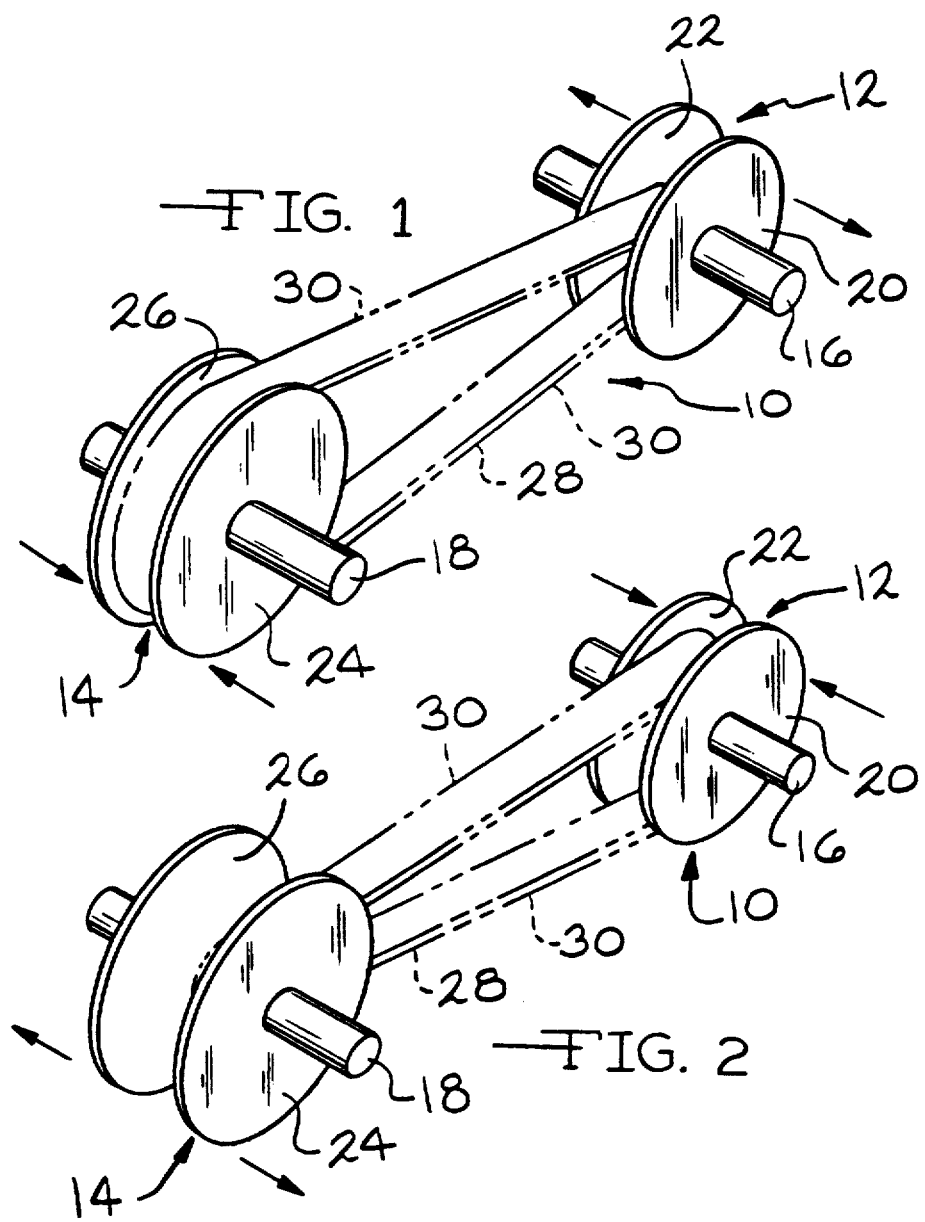

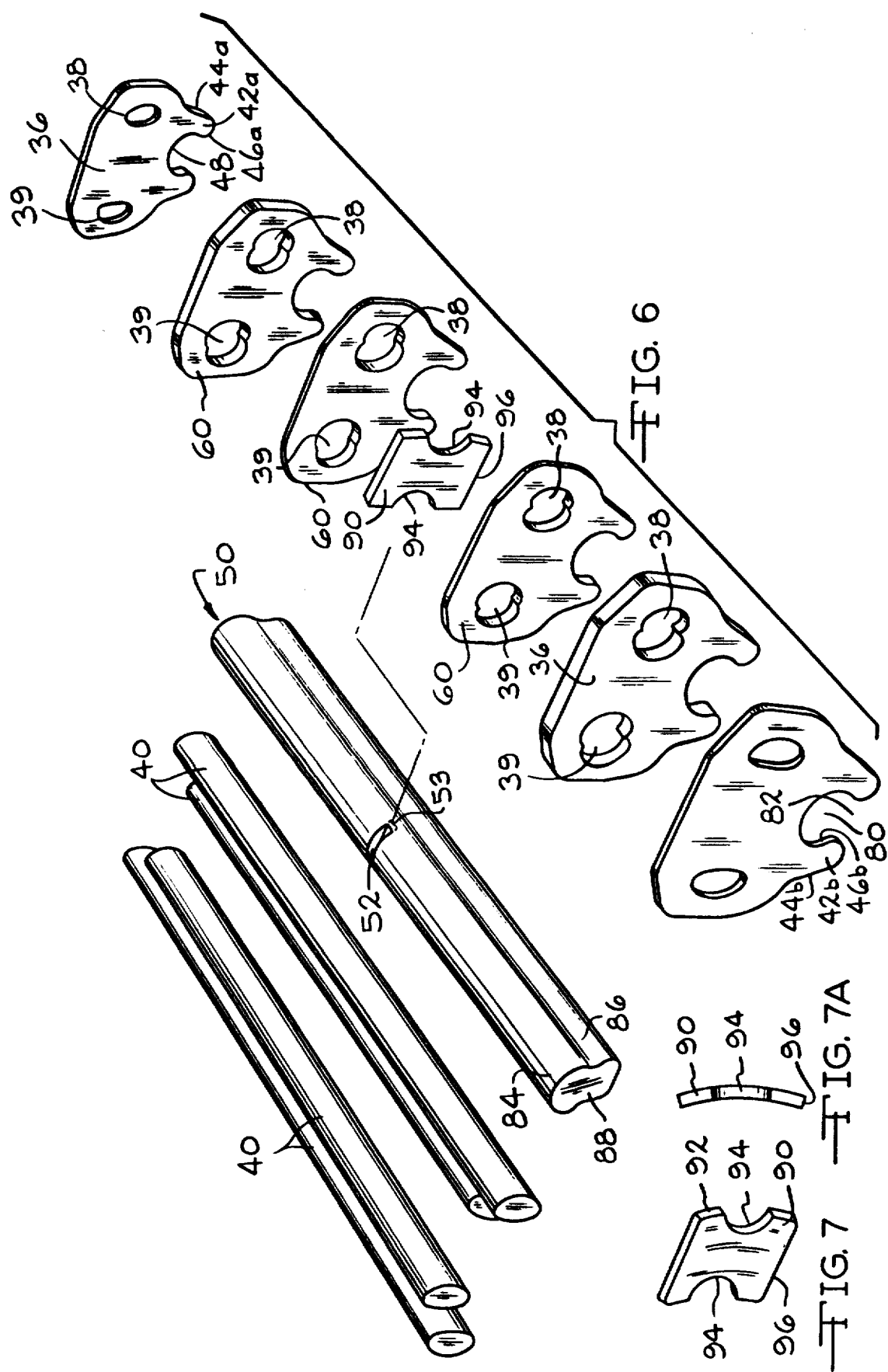

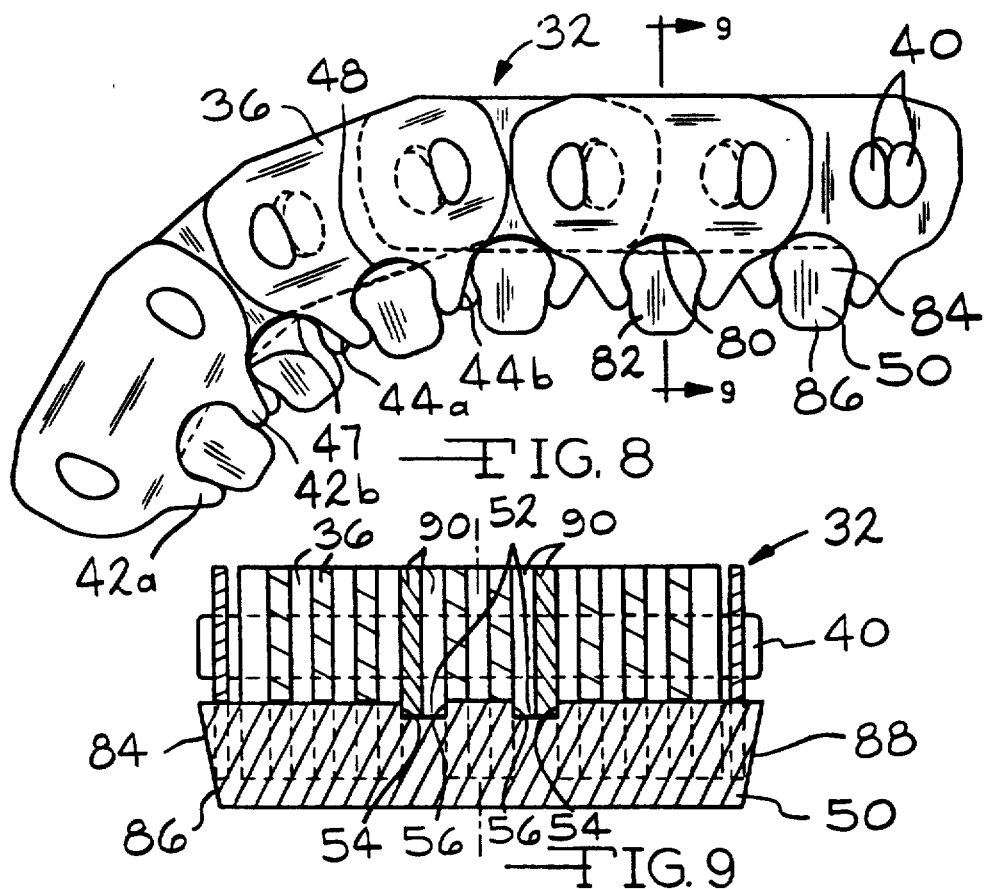
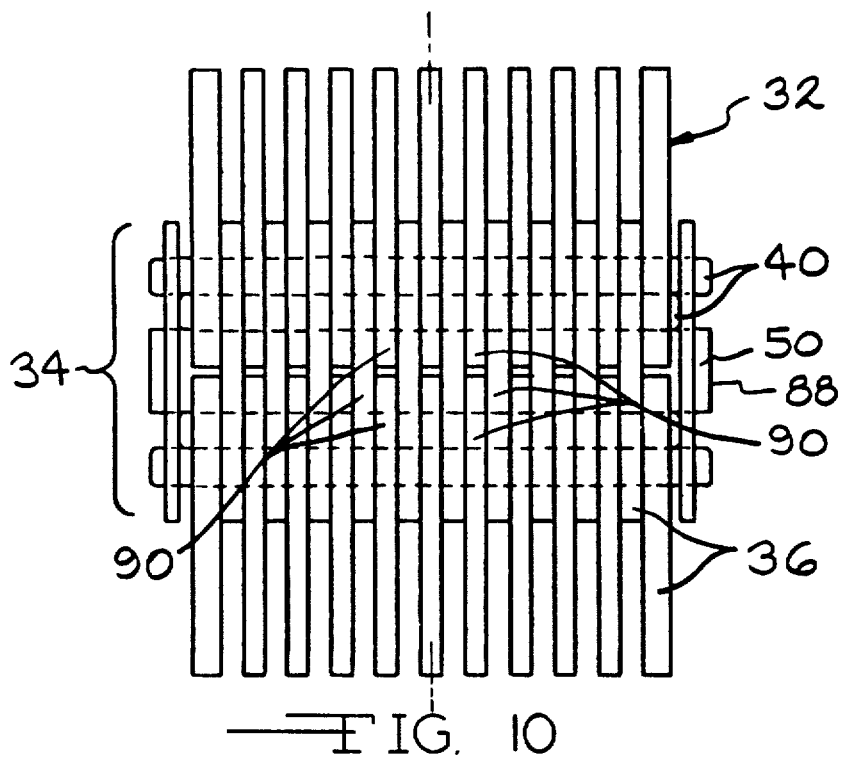

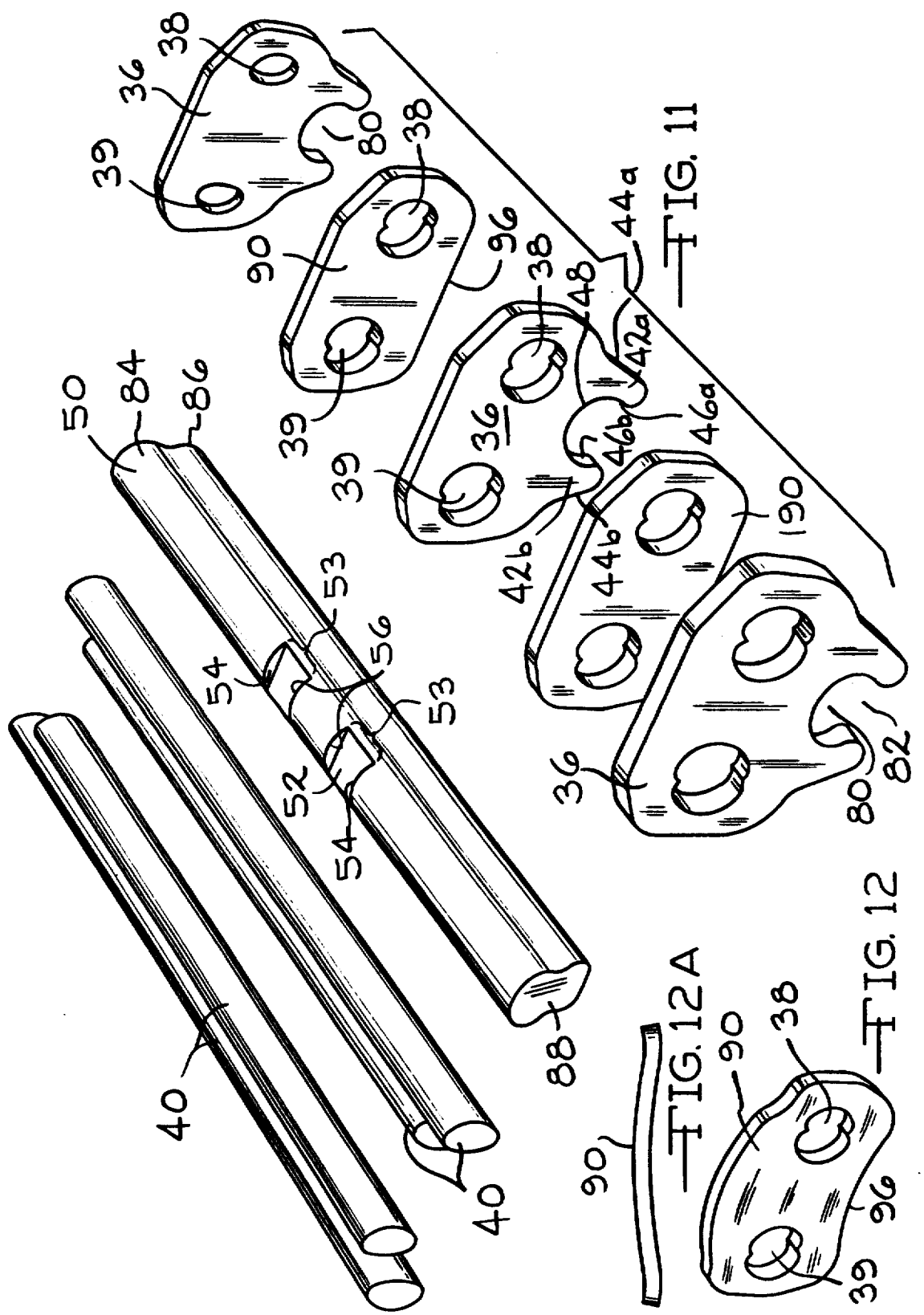

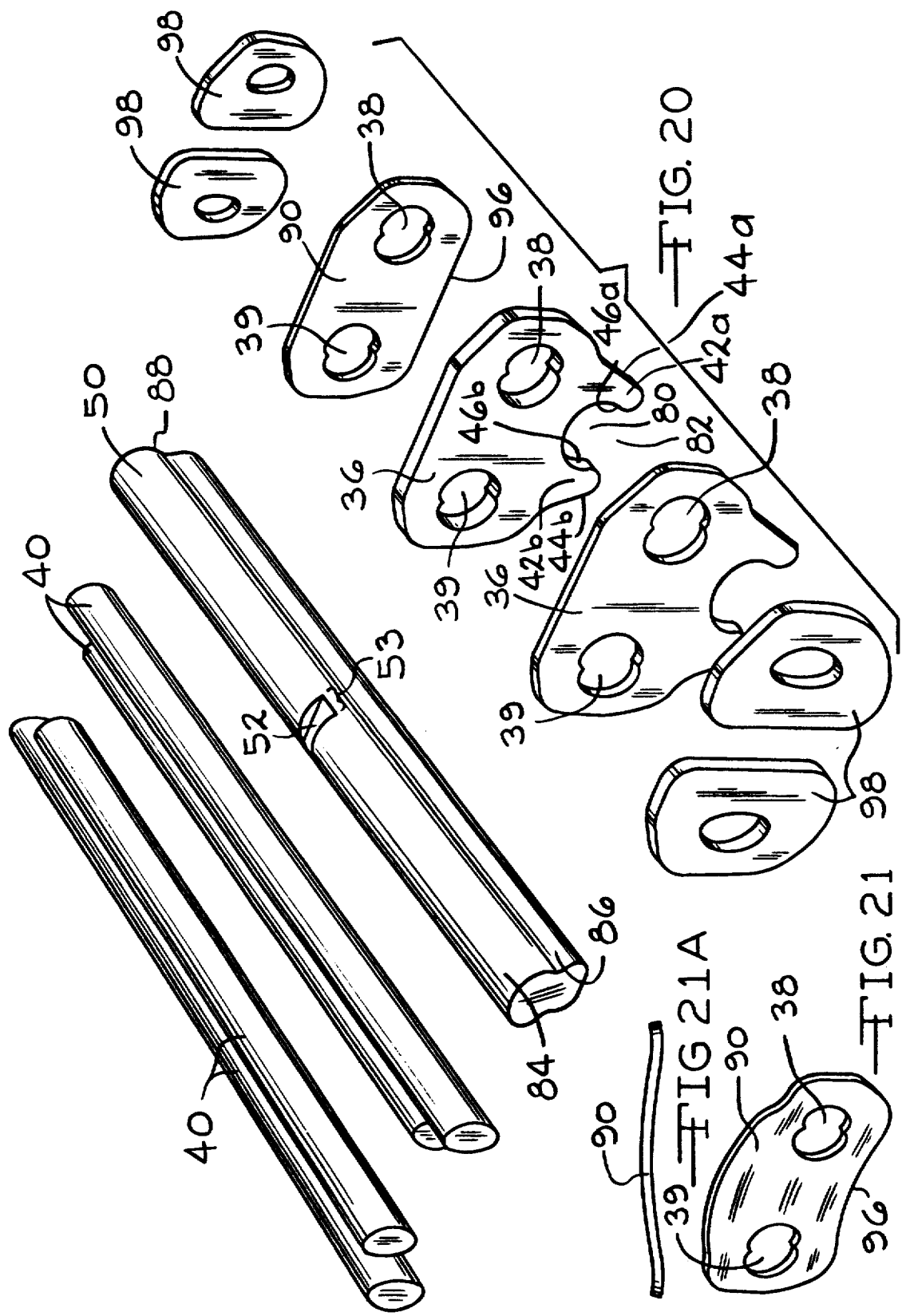

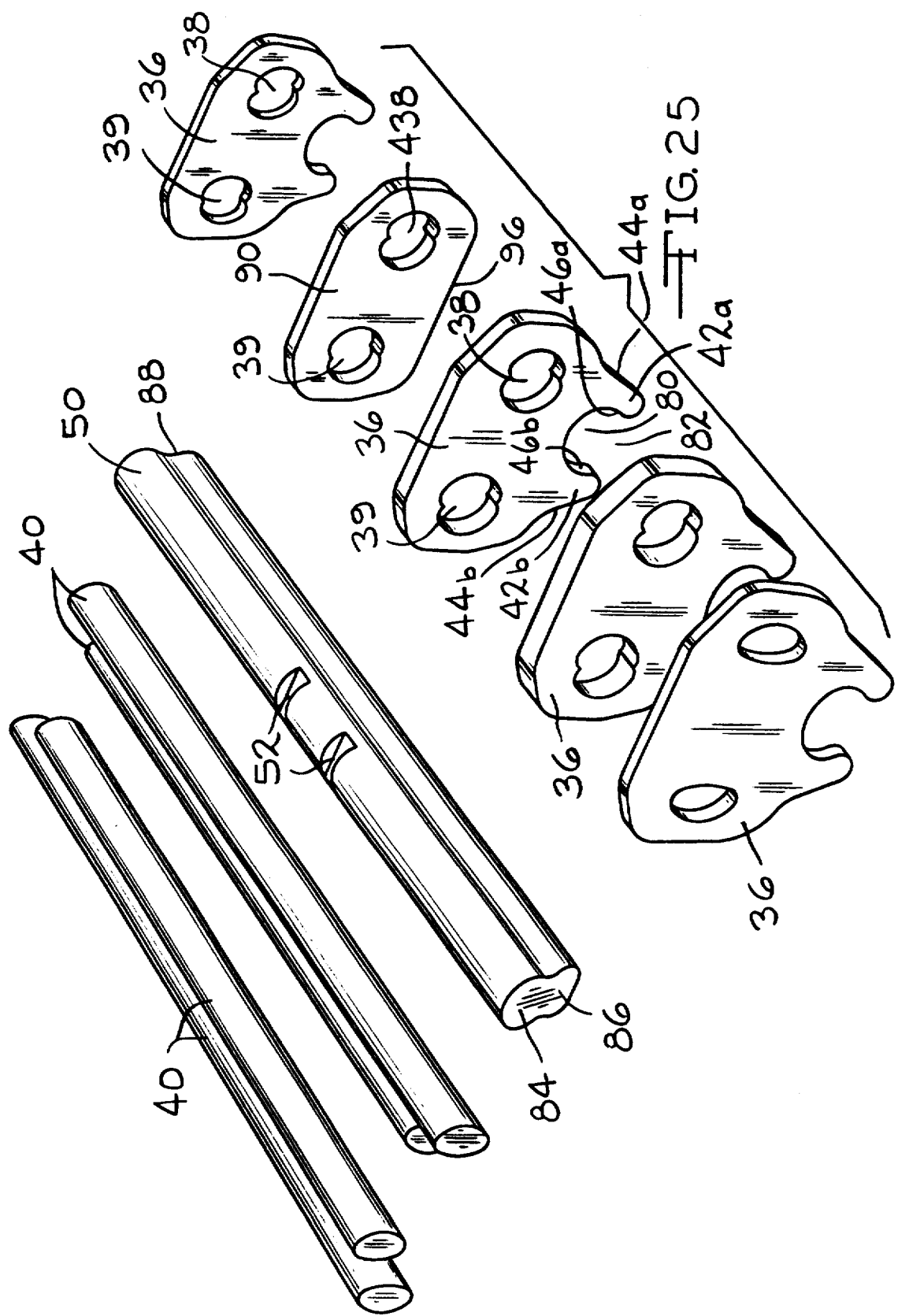

CHAIN-BELT

DESCRIPTION

1. Technical Field

This invention relates to metal chain-belts especially adapted to connect the pulleys or sheaves of a pulley transmission, particularly a continuously variable transmission (CVT). The invention broadly comprises a tension member or carrier constructed of a plurality of interlaced links arranged in transverse sets with the adjacent sets joined by pivot means. Underslung struts are carried by the links for engaging the CVT sheaves and transmitting torque to the interlaced links.

This application is related No. to application Ser. No. 07/496,565, filed Mar. 20, 1990 now U.S. Pat. No. 5,061,226. The subject-matter of the '565 application is expressly incorporated herein, by reference.

2. BACKGROUND ART

CVT transmissions for transferring torque from an input or drive shaft to an output or driven shaft usually include a belt and pair of pulleys or sheaves, one mounted on each shaft. Each pulley includes a pair of flanges, at least one of which is conical. The flanges are mounted on their respective shaft such that at least one of the flanges is axially moveable with respect to the other flange. This axial movement of flanges with respect to each other achieves the alteration of the effective diameter of the pulley. As the effective diameter of one pulley is changed, the effective diameter of the other pulley is also changed in the opposed direction and, the drive ratio between the input and output shafts is adjusted in a smooth, continuous manner. A flexible belt connects the two pulleys to transfer torque therebetween when the input shaft is driven.

Automotive engineers have long recognized that, if the transmission drive ratio could be continuously adjusted for various loads and speeds, the engine could be run at its maximum operating efficiency. This kind of continuous variation is not possible when a conventional geared transmission, which provides adjustment to the drive ratio in discrete steps, is teamed with an engine. Accordingly, there are continuing efforts to engineer and commercialize a continuously variable transmission (CVT) of the type generally described above. These efforts have resulted in the production and marketing, in Europe, of the DAF passenger car which uses flexible, continuous rubber belts to drivingly interconnect the transmission pulleys or sheaves. More recently, Fiat and Volvo have produced automobiles incorporating CVTs using respectively, metal belts and rubber belts. Rubber belts have many drawbacks because of the various adverse conditions under which they must operate and are usually considered to be inferior to metal belts. While metal belts are generally considered more durable than rubber belts, they have encountered drawbacks relating to operational noise and market economics. Some of the various efforts to produce metal belts which are durable, relatively quite in operation, and also economical to market, are described in the patent and other literature.

Flexible metal belts for use in CVTs are generally of two varieties, those referred to as "push" belts and those referred to as "pull" belts. Push belts are currently being used in the Fiat automobile's CVT. An example of a push belt is described in VanDoorne et at., U.S. Pat. No. 3,720,113 and an example of a pull belt is described in Cole, Jr., et al., U.S. Pat. No. 4,313,730. The VanDoorne et al. belt comprises an endless carrier constructed of a plurality of nested metal bands and an endless array of generally trapezoidal (when viewed from the front) load blocks or struts encircling tne carrier and longitudinally movable therealong. Each block has edge surfaces for engaging the sheaves of a pulley transmission to transmit torque therebetween. The push belt as described above is relatively expensive to manufacture and must be installed and/or replaced as a complete endless loop, precisely matched with the pulley transmission. Thus, disassembly of at least part of the pulley transmission is required, not only for the initial assembly, but also for replacement of the push belt due to failure of one or more load blocks or one or more of the carrier bands.

The pull belt offers a less expensive alternative to the push belt. No precise matching of carrier parts is required. Some pull belts can be assembled with a finite length, positioned around the pulleys and the ends then connected by a pivot member. Thus, disassembly of the pulleys is not always required for initial installation or replacement of a belt. The pull belt of Cole, Jr., et al. utilizes an endless chain as the carrier, the sets of links of which are pivotally interconnected by pivot means. Load blocks or struts encircle the links; however, the load blocks are constrained against longitudinal movement along the chain by the pivot means.

Another example of a pull belt is shown in Ledvina, U.S. Pat. No. 4,569,671 which utilizes a chain-belt comprising a plurality of interleaved sets of links and load blocks associated therewith. Each link is defined by toes, the toes of each link being defined by parallel inside flanks joined by a crotch. A load block is received between the inside flanks and extends around the links. A hardened insert is located between the links and the blocks to protect the links and improve the durability of the chain.

Other designs for CVT metal belts utilize rod-like struts having angled ends for engaging the sheaves of the transmission. The struts are inserted through interleaved links having generally round clearance holes. Some of the links have clearance holes that are flat on top to receive the flattened ends of the struts. Each row of links will utilize a pair of the links having flat-topped clearance holes to retain the strut and prevent transverse movement. Another embodiment of this design utilizes a link having a press-fit, round aperture into which the strut is forced. Each row of interleaved links will utilize the press-fit type retainer to maintain the strut in proper transverse orientation.

U.S. Pat. No. 4,710,154 utilizes large pins and rockers or pivot means that also act as the load blocks or struts. The interleaved lacing of the links is held together by an inverted U-shaped clip, which fits over the end of the pivot means or pins and rockers. The pins are laterally retained by small beads of weld, which prevent them from fitting through the apertures of the clips and links. An earlier embodiment of this chain design is disclosed in U.S. Pat. No. 3,916,709 which utilizes tabbed links to engage a notch in the pivot means or pin.

Recent improvements in CVT metal chains have led to designs utilizing struts or load blocks that are underslung the interleaved links and are distinct form the pivot means. Early designs of such underslung struts have a load-bearing area underslung from the interleaved links and vertical bars extending from the load-bearing area that engage the pivot pins and capture the interleaved links. An alternative design utilizes a single centerline positioned vertical bar designed to engage the pivot pins and use of outside links being press-fit over the pins to hold the interleaved lacing together.

Our related patent application Ser. No. 07/496,565, filed Mar. 20, 1990, discloses a variety of improvements in underslung strut designs wherein the underslung struts are retained in position with the interleaved links through: the use of flat bottom links that fit into shallow notches located near the ends of the strut; spring clips fitting over the interleaved links and resting against steps located on the ends of the struts; press-fit guides that rest against steps in the ends of the struts; spring links that are press-fit on the struts; and, guides on each side of the interleaved links that engage vertical flats on both ends of the struts. In all embodiments shown in the '565 application, with the exception of the press-fit spring links, the strut is restrained from lateral or transverse movement with respect to the interleaved links through a method of engagement at the end of the struts. These designs weaken the strut by reducing the amount of material at the ends of the strut where the high contact stress of engagement with the sheaves is carried. In some applications, chipping of the strut material has resulted on the contact face of the strut. Finally, such strut designs sometimes result in the need for duplication of different strut designs, having varied strut retention mechanisms and notch locations, for use in a given chain-belt to accommodate the differences in lacing width at each row of interleaved links, if lateral motion is to be minimized. For instance, a guide row of links would require a strut having a different length notch design when compared with a non-guide row, in any given chain.

DISCLOSURE OF THE INVENTION

A metal power transmission chain-belt especially adaptable for connecting the sheaves of a pulley transmission is provided which includes a tensile member constructed of a plurality of interleaved or laced sets of links, each set having a plurality of transversely arranged links. The links resemble those of a silent chain having generally opposed toes extending from the bottom of the link, defining a passageway. Pivot means join the adjacent sets of links to form an endless loop. Struts are connected to the links by being positioned in the passageway defined by the toes. The struts have edge surfaces for contacting the sheaves of the transmission. Each strut edge is adapted to contact the sheaves of the transmission and each has a thickness which substantially fills the space between the toes so that the block is vertically held against the bottom of its set of links. The struts are each retained form transverse movement in its respective set of links by a variety of methods. The methods are designed to provide a larger contact area on the end of the strut and eliminate notches or flats on the ends of the strut which reduce the cross section and therefore reduce the torque carrying capacity of the strut. The retention methods further reduce the amount of lateral motion of the struts and reduce the number of different types of struts needed in a chain-belt. Finally, the present invention may incorporate spring-links in the strut retention means to achieve further damping of the chain-belt which reduces the free strand vibration of the chain-belts.

BRIEF DESCRIPTION OF THE DRAWINGS

FIG. 1 is a schematic illustration of a continuously variable transmission (CVT) as used with the present invention.

FIG. 2 is a schematic illustration of the continuously variable transmission (CVT) of FIG. 1 having an adjusted drive ratio.

FIG. 6 is an exploded perspective view showing the components of the chain-belt of FIG. 3.

FIG. 7 is a respective view of the retainer link used with the chain-belt of FIG. 3 modified to include bowing from top to bottom.

FIG. 7A is a side view of the retainer link of FIG. 7.

FIG. 8 is a side view of an alternative embodiment of the chain-belt of the present invention.

FIG. 9 is a cross-sectional view taken along line 9—9 of FIG. 8.

FIG. 10 is a plane view of the chain-belt of FIG. 8.

FIG. 11 is an exploded perspective view showing the components of the chain-belt of FIG. 8.

FIG. 12 is a perspective view showing the retainer link used with the chain-belt of FIG. 8 modified to include bowing.

FIG. 12A is a top view of the retainer link of FIG. 12.

FIG. 20 is an exploded perspective view showing the components of the chain-belt of FIG. 17.

FIG. 21 is a perspective view showing the retainer link used with the chain-belt of FIG. 17 modified to include bowing.

FIG. 21A is a side view of the retainer link of FIG. 21.

FIG. 25 is an exploded perspective view showing the components of the chain-belt of FIG. 22.

BEST MODE FOR CARRYING OUT INVENTION

Figure 3:
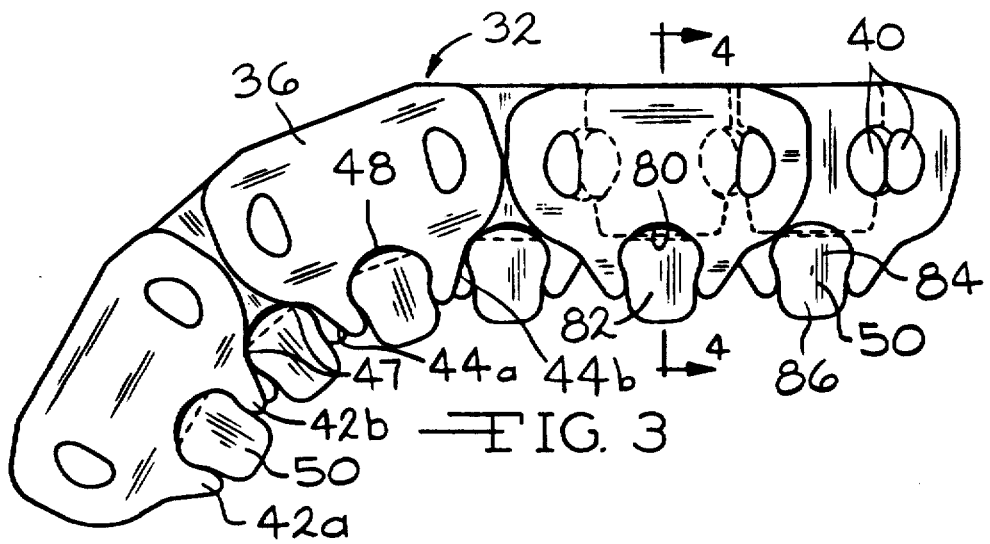
FIG. 3 is a side view of the chain-belt of the present invention.

FIGS. 1 and 2 illustrate schematically a CVT 10 set up for two distinct drive ratios. CVT 10 comprises a pair of pulleys or sheaves 12 and 14 connected respectively to shafts 16 and 18, one of which is the driven shaft and other of which is the drive shaft. Pulley 12 includes a pair of flanges 20, 22 at least one of which is the driven shaft and other of which is the drive shaft. Pulley 12 includes a pair of flanges 20, 22, at least one of which has a conical shape, and pulley 14 also includes a pair of flanges 24, 26, at least one of which also has a conical shape. The pulleys or sheaves 12, 14 are connected by a chain-belt 28, the side edges 30 of which frictionally engage the flanges to transmit drive torque between the sheaves 12, 14. At least one flange of each sheave 12, 14 is axially movable with respect to the other, so as to vary the radial distance of the engagement point of the chain-belt 28 on the flanges, thereby altering the drive ratios between the sheaves 12, 14. The arrows indicate the relative direction of axial movement of the flanges to effect the different drive ratios of the CVT 10.

Figure 4:
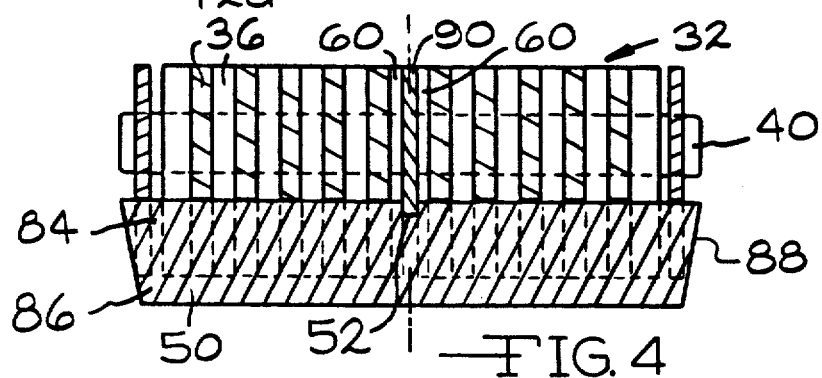
FIG. 4 is a cross-sectional view taken along line 4—4 of FIG. 3.
Figure 5:
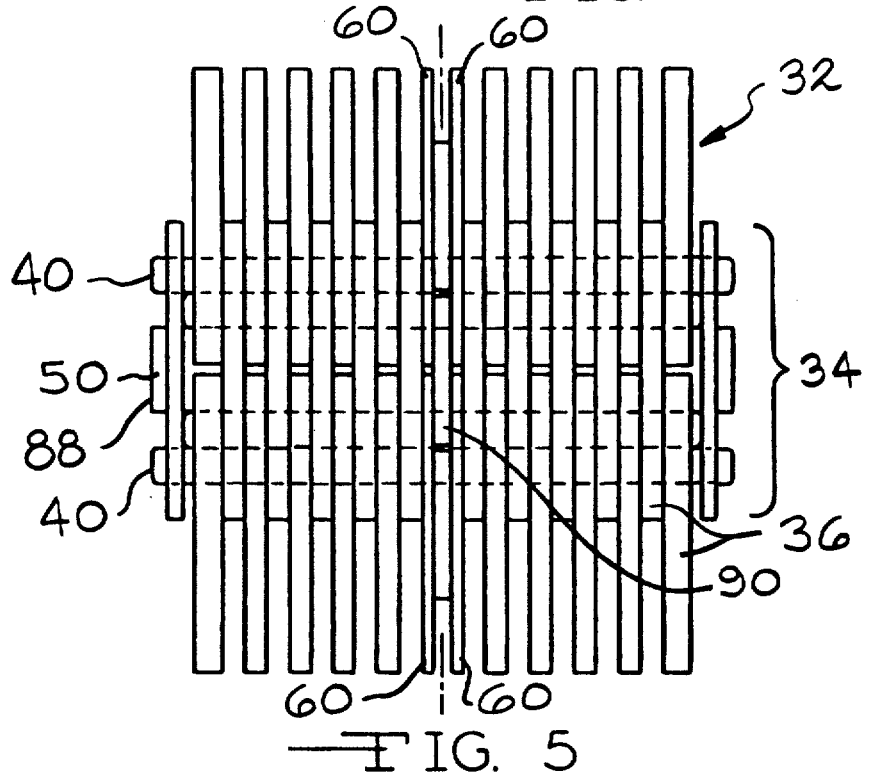
FIG. 5 is a plane view of the chain-belt of FIG. 3.

Referring now to FIGS. 3–6, the general configuration of a chain-belt 32 utilized with this invention is shown. The chain-belt 32 includes a plurality of interleaved or laced sets 34 of links 36, each link 36 having a pair of spaced apertures 38, 39. The apertures 38, 39 are arranged so that pivot means 40 extends through the apertures 38, 39 to join the adjacent sets of links 36 thus permitting the chain-belt 32 to articulate. The pivot means 40 shown are a pin and rocker variety but other known types of pivot means may be utilized with this invention.

Each link 36 has a pair of toes 42a, 42b which are defined by outside flanks 44a, 44b and inside flanks 46a, 46b. The toes 42a, 42b are disposed to extend from the links 36 in a direction toward the shafts 16, 18 of the CVT 10 when the chain-belt 32 is properly positioned on the CVT. The inside flanks 46a, 46b are spaced apart and have a generally opposed relationship. The inside flanks 46a, 46b are generally arcuate in shape and are joined together by a curved crotch 48. The configuration of the inside flanks 46a, 46b and the curved crotch 48 result in the opposed toes 42a, 42b forming a substantially circular passageway 80 wherein the ends of the toes 42a, 42b that are spaced apart from the pivot pins define an opening 82.

A load block or strut 50 is associated with each set 34 of links 36 and is received in the passageway 80 formed by the opposed toes 42a, 42b. The upper region 84 of the strut 50 has the same basic shape as the passageway 80 and is sized slightly smaller than the passageway 80 to allow the strut 50 to be easily positioned in the passageway 80. Each strut 50 has a lower portion 86 that extends from the passageway 80 through the opening 82. Each strut 50 has opposed ends 88 that are designed to engage the flanges 20, 22 of sheave 12 and flanges 24, 26 of sheave 14 of the CVT 10. The struts 50 are preferably constructed to be a solid metal block to provide the maximum strength and resistance to wear during operation of the CVT 10.

When the chain-belt 32, as generally configured in FIGS. 3–6, is in operation, the upper region 84 of the strut 50 is pressed into contact with the curved crotch 48 area of the links 36 as the chain-belt 32 engages the sheaves 12, 14 of the CVT 10. The forces encountered by the struts 50 are thus effectively distributed. through the curved crotch 48, across the width of the links 36 and directed to a segment of the links 36 which is very strong. Due to the respective configuration of the strut 50 and the links 36, the toes 42a, 42b do not receive a significant portion of the forces placed on the struts 50 by the sheaves 12, 14 of the CVT 10.

The flanges of the sheaves 12, 14 of the CVT 10 place essentially two types of forces on the struts 50. The primary force is received by the strut 50 from a radial direction that is generally perpendicular to the direction of travel of the chain-belt 32. The radial force acts to push the struts 50 into the crotch 48 of the links 36, so that the upper portion 84 of the strut 50 engages the curved crotch 48 at points of contact 47. There is also a secondary force, much smaller than the primary force, acting on the struts 50. This secondary force is applied substantially in the tangential direction or the same direction as the direction of travel of the chain-belt 32. The crotch 48 is so constructed that the resulting force vector is always directed between the points of contact 47 on the link crotch 48. These points of contact 47, spaced across the upper region 84 of the strut 50, act to stabilize the strut 50 and substantially reduce the potential for rotation of the strut 50 during operation of the chain-belt 32. As noted above, the contact areas in the crotch 48 of the links 36 at the points of contact 47 are disposed so that the resultant force vector that acts on the struts 50 is always located between the points of contact 47. Accordingly, most of the forces acting on the struts 50 are transferred to the crotch area 48 of the links 36 and very little force is directed to the toes 42a, 42b of the links 36.

Although each link 36 has been described as having a pair of toes 42a, 42b, it should be recognized that it is only necessary that the toes 42a, 42b form a passageway 80 for receiving the strut 50. Thus, it is possible for each link 36 to have only one toe 42 with the toes on adjacent links 36 being disposed in opposed relationship to form the passageway 80 for the strut 50. Also, it is not necessary for the toes 42a, 42b to form a substantially circular passageway 80. The toes 42a, 42b can have modified configurations to enable the passageway 80 formed by the toes 42a, 42b to receive struts 50 of diverse configuration and maintain the strut 50 in the proper position adjacent the links 36. However, the upper region 84 of the strut 50 located in the passageway 80 should always preferably be shaped to effect the transfer of forces from the CVT 10 in the manner described above.

Referring specifically now to FIGS. 3–6, a chain-belt 32 incorporating the present invention is shown. In the chain-belt 32, the center link in every other set 34 of links 36 is replaced with two similar links 60 which are, preferably, one-half the thickness of the replaced center link. A keystone-shaped retaining link 90 is located between the two half thickness links 60 so that it is generally positioned along the centerline of the chain-belt 32. The strut 50 has a notch 52 disposed horizontally across its upper region 84 along its centerline. The retaining link 90 is essentially shaped like a keystone. The retaining link 90 is designed to facilitate proper chain-belt 32 articulation. Each side 92 of the retaining link 90 has a curved notch 94 for engaging the pivot means 40 extending through the apertures 38, 39, of the links 36. The engagement between the pivot means 40 and the curved notches 94 serve to hold the retaining link 90 in proper position between the two half thickness links 60. The bottom 96 of the retaining link 90 is, preferably, flat or slightly curved to accommodate motion of the retaining link 90 during chain-belt 32 articulation. The bottom 96 of the retaining link 90 is disposed to engage the shallow, horizontal notch 52 in the strut 50. The engagement between the bottom 96 of the retaining link 90 with the horizontal notch 52 eliminates excessive transverse or lateral motion of the strut 50 with respect to the links 36. The provision of a single shallow, horizontal notch 52 provides for symmetry to the strut 50 so that the strut 50 does not have to be oriented end-for-end during assembly of the chain-belt 32. A single strut 50 design may be utilized for both guide rows and non-guide rows. As shown in FIGS. 7 and 7A, the retaining link 90 can be modified to bow the retaining link 90 from top to bottom. The bowed retaining link 90 is partially compressed during assembly of the chain to provide damping characteristics to the chain-belt 32. Such damping reduces the free-strand vibration, thereby reducing chain-belt noise and increasing chain-belt durability.

Referring now to FIGS. 8-11, an alternative embodiment of the present invention is shown. Each set 34 of links 36 of the chain-belt 32 incorporates two full-thickness retaining links 90. The retaining links 90, preferably, have substantially flat or slightly curved bottoms 96 that are disposed to engage shallow, horizontal notches 52 located in the upper region 84 of the strut 50. The horizontal notches 52 are located close in proximity to and equally spaced from the centerline of the strut 50. The horizontal notches 52 have a width 53 which is generally double the width of the retaining link 90. Each retaining link 90 has apertures 38, 39 arranged so that the pivot means 40 extends through the apertures 38, 39 to the adjacent links 36 to permit the chain-belt 32 to articulate. The retaining link 90 is designed to facilitate proper chain-belt 32 articulation. The retaining links 90 are interleaved and arranged such that in one set 34 of links 36, they engage the outside edges 54 of the horizontal notches 52 and, in the adjacent set 34 of links 36, the retaining links 90 engage the inside edges 56 of the horizontal notches 52. The engagement between the bottoms 96 of the retaining links 90 and the horizontal notches 52 effectively reduces excessive transverse or lateral motion of the strut 50 with respect to the links 36. Also, as with the preferred embodiment, a single strut 50 design is applicable for all sets 34 of links 36. Because the notches 52 are equally spaced from the centerline of the strut 50, the strut 50 does not need to be oriented end-for-end during assembly. Finally, the embodiment of this invention, as shown in FIGS. 8-11, can be modified to bow the retaining link 90 from end-to-end as shown in FIGS. 12 and 12A. This bowing of the retaining link 90 will assist in providing damping forces to the chain-belt 32 as discussed previously with regard to the preferred embodiment.

Figure 13:
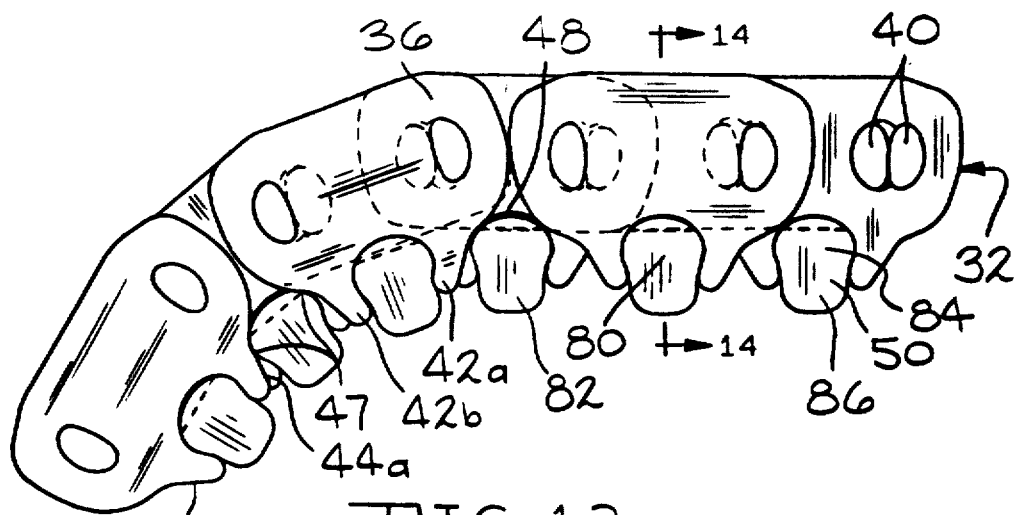
FIG. 13 is a side elevational view of another embodiment of the chain-belt of the present invention.
Figure 14:
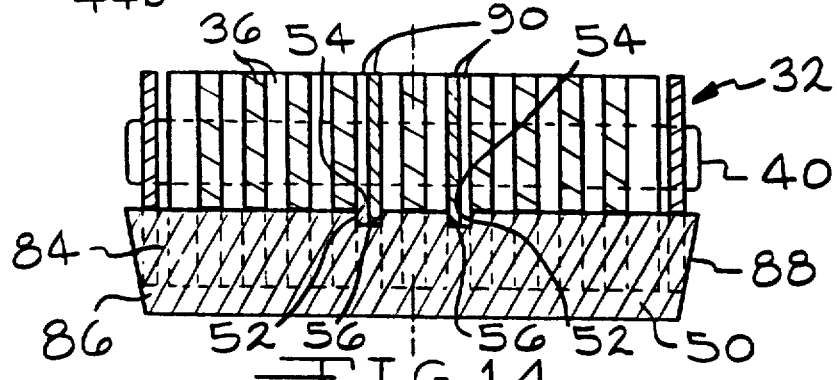
FIG. 14 is a cross-sectional view taken along line 14—14 of FIG. 13.
Figure 15:
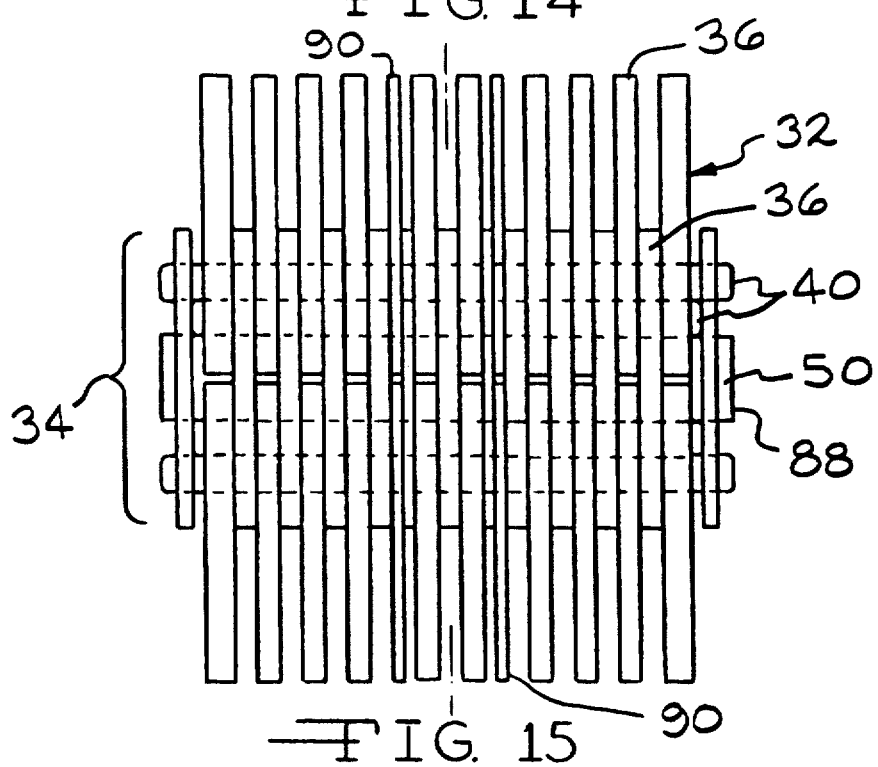
FIG. 15 is a plane view of the chain-belt of FIG. 13.
Figure 16:
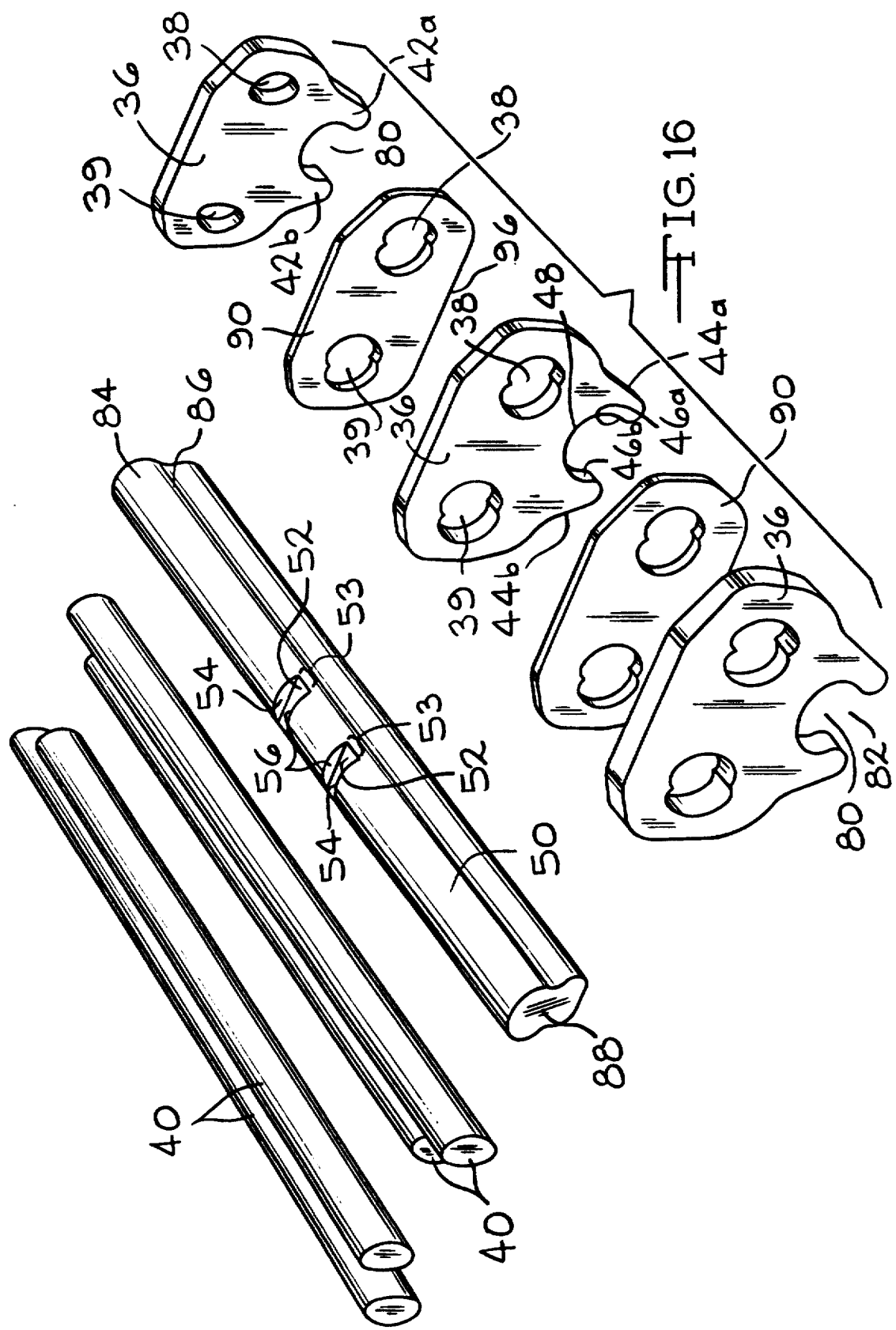
FIG. 16 is an exploded perspective view showing the components of the chain-belt of FIG. 13.

Referring now to FIGS. 13-16, an alternative embodiment of the present invention is shown. Each set 34 of links 36 of the chain-belt 32 incorporate two half thickness retaining links 90. The retaining links 90, preferably, have substantially flat or slightly curved bottoms 96 to engage shallow horizontal notches 52 located in the upper region 84 of the strut 50. The horizontal notches 52 are located close in proximity to and equally spaced from the centerline of the strut 50. The horizontal notches 52 have a width 53 equivalent to the full width of a standard link 36. Each retaining link 90 has apertures 38, 39 arranged so that the pivot means 40 extends through the apertures 38, 39 to the adjacent links 36 to permit the chain-belt 32 to articulate. The retaining link 90 is designed to facilitate proper chain-belt 32 articulation. The retaining links 90 are interleaved and arranged such that, in one set 34 of links 36 they engage the outside edges 54 of the horizontal notches 52 and, in the adjacent set 34 of links 36 the retaining links 90 engage the inside edges 56 of the horizontal notches 52. It can be seen that the embodiment shown in FIGS. 13-16 is similar to the embodiment shown in FIGS. 8-11, but utilizes half-thickness retaining links 90 rather than full-thickness retaining links. As a result, there is one more standard link 36, in each set 34, to retain the strut 50 and carry the radial sheave load placed on the chain-belt 32 by the CVT 10. Again, the engagement between the bottom 96 of the retaining links 90 with the horizontal notches 52 substantially reduces transverse or lateral motion of the struts 50 with respect to the links 36. Also, as with the preferred embodiment, the strut 50 does not need to be oriented end-for-end during assembly and a single strut 50 design is applicable for all sets 34 of links 36. Finally, the embodiment of this invention, as shown in FIGS. 13-16, can be modified to bow the retaining link 90 from end-to-end as shown in FIGS. 21 and 21A. The bowing of the retaining link 90 will assist in providing damping forces to the chain-belt 32 as discussed previously with regard to the preferred embodiment.

Figure 17:
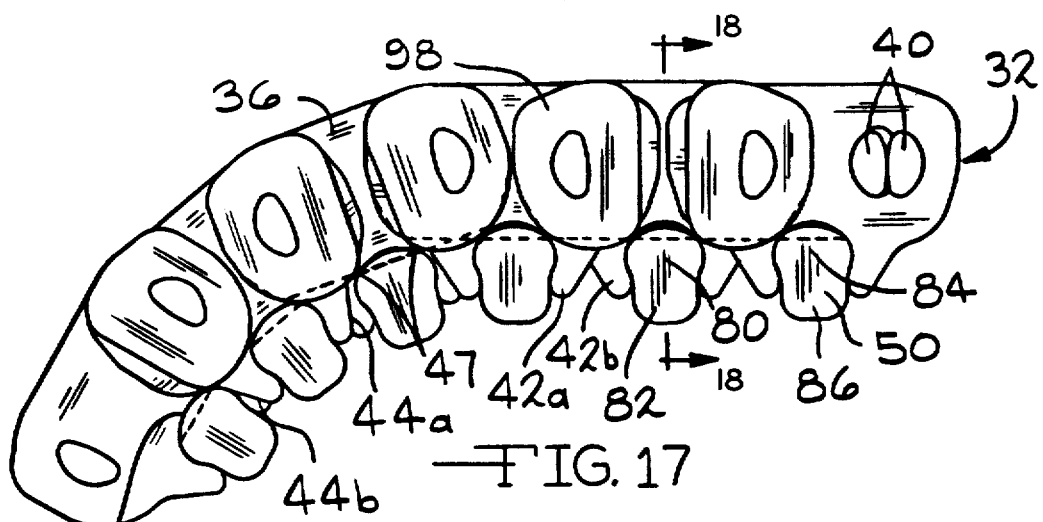
FIG. 17 is a side elevational view of a third alternative embodiment of the chain-belt of the present invention.
Figure 18:
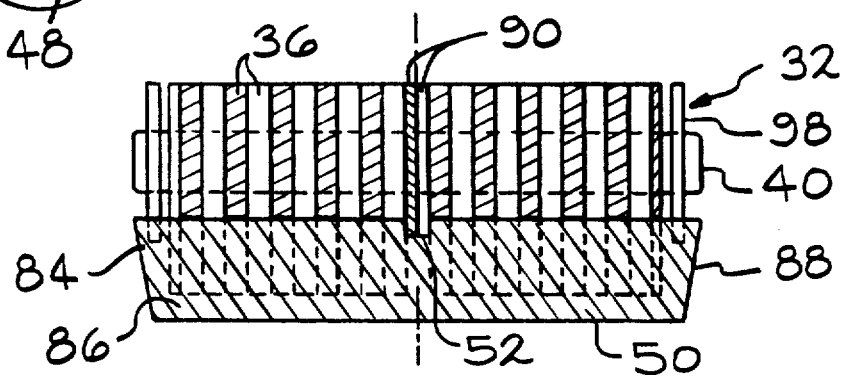
FIG. 18 is a cross-sectional view taken along line 18—18 of FIG. 17.
Figure 19:
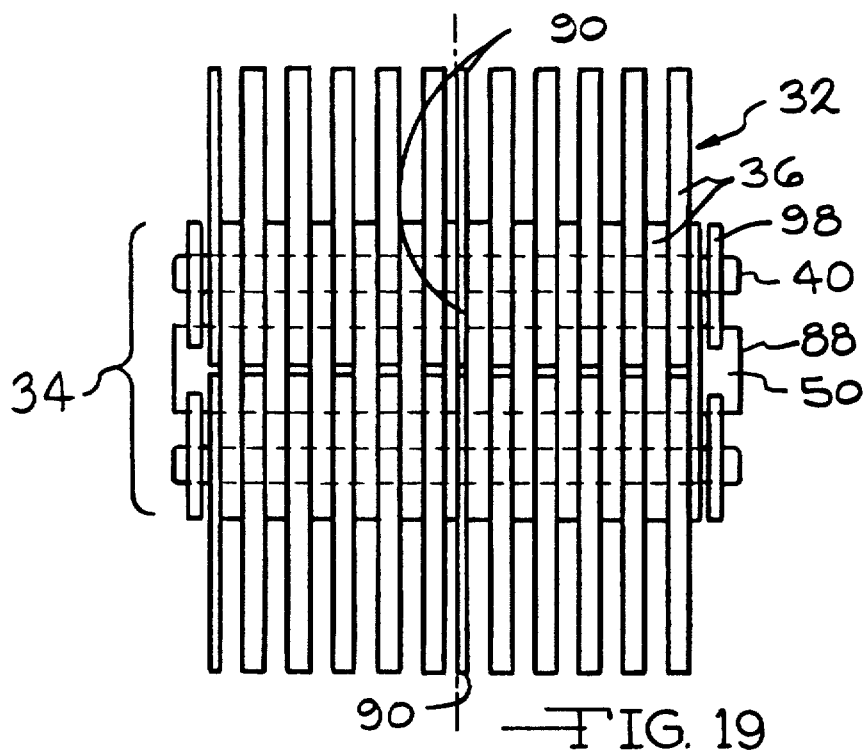
FIG. 19 is a plane view of the chain-belt of FIG. 17.

Yet another alternative embodiment of the present invention is shown in FIGS. 17-20. The chain-belt 32 includes a single half-thickness retaining links 90 that engages a shallow, horizontal notch 52 located in the upper region 84 of the strut 50, at the centerline of the strut 50. The notch 52 has a width equivalent to the full width of a standard link 36. Since there is only one retaining link 90 per link set 34, there will be a small degree of lateral movement on the part of the strut 50 with regard to the set 34 of links 36. Preferably, the retaining links 90 are staggered in their positioning in the notches 52 of adjacent sets 34 of links 36. The staggered retaining links 90 displace the usual center link in the chain's 32 lacing by shifting it one position over. Preferably, the retaining links 90 include spaced apertures 38, 39, for receiving the pivot means 40. The retaining links 90 are designed to facilitate proper chain-belt 32 articulation. Further, the retaining links 90 have a substantially flat bottom 96 or a slightly curved bottom 96 to engage the horizontal notch 52 of the strut 50. As with the previous embodiments, the strut 50 is restrained from further lateral movement by the engagement between the retaining link 90 and the notch 52. Since the notch 52 is located on the centerline, the same benefits to strut 50 design as with the previous embodiment is also available. The retaining link 90 can be modified by bowing the link 90 from end-to-end, as shown in FIGS. 21 and 21A, to effect the damping forces as discussed previously. Further, the sets of links may be contained in their interleaved stack or set 34 by washers 98 which are press-fit onto the ends of the pivot means or pins 40.

Figure 22:
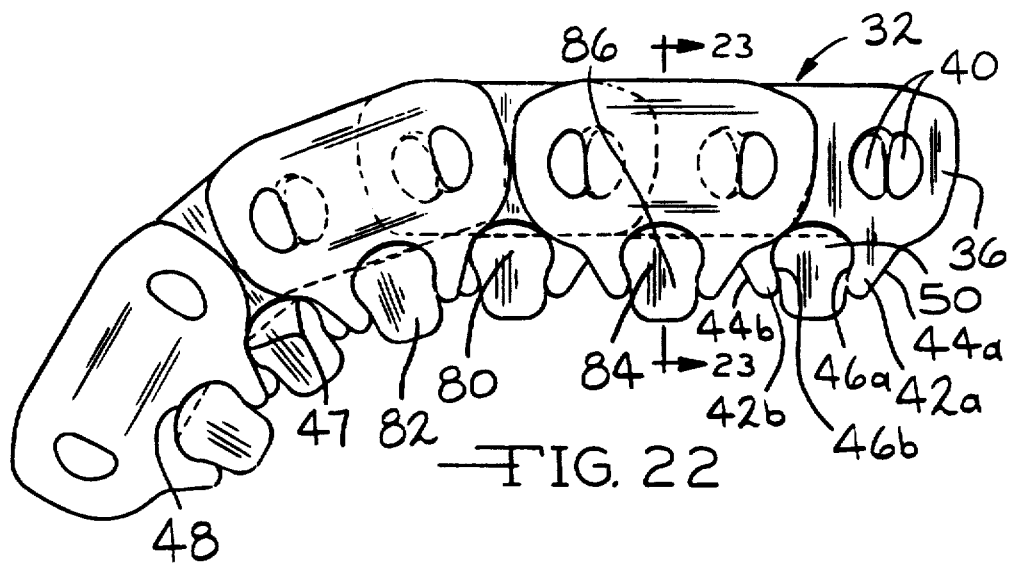
FIG. 22 is a side elevational view of a fourth alternative embodiment of the chain-belt of the present invention.
Figure 23:
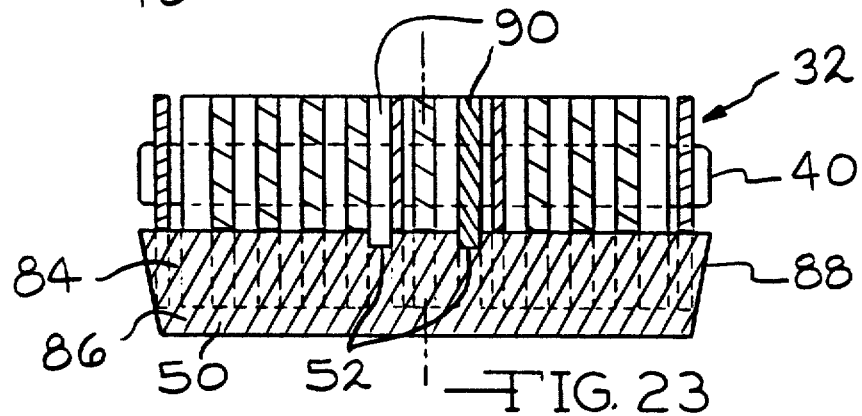
FIG. 23 is a cross-sectional view taken along line 23—23 of FIG. 22.
Figure 24:
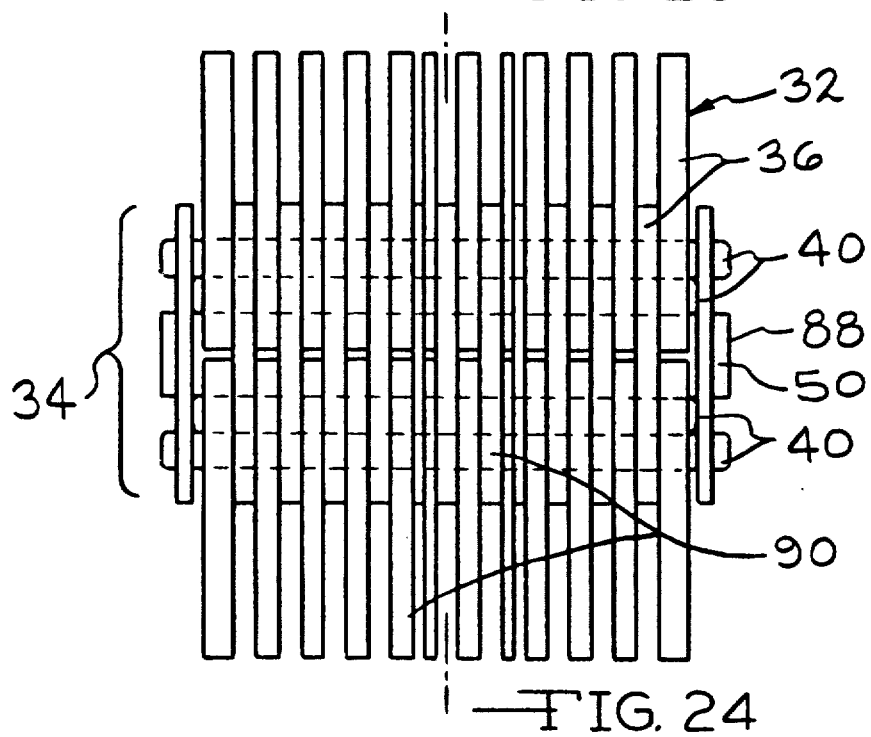
FIG. 24 is a plane view of the chain-belt of FIG. 22.

Referring now to FIGS. 22-25, another alternative embodiment of the present invention is shown. The chain-belt 32 again includes struts 50 having two shallow, horizontal notches 52 located in the upper region 84 of the strut 50 proximate to and equally spaced from the centerline. Retaining links 90 are staggered within the sets 34 of links 36. A single retaining link 90 can be utilized with each link set 34 which substantially engages one of the notches 52. The remaining notch 52 remains open without affecting the substantial reduction of the lateral strut 50 motion with respect to its set 34 of links 36. Preferably the retaining links 90 have flat or slightly curved bottoms 96 for engaging the notches 52. Since the notches 52 are equally spaced from the centerline of the strut 50, the strut 50 does not have to be oriented end-to-end during assembly and a single strut 50 design could be utilized in both guide and non-guide sets 34 of links 36. Again, this embodiment can be modified to bow the retaining link 90 from end-to-end as shown in FIGS. 12 and 12A, to effect the damping forces as previously discussed.

With the exception of the keystone retaining link 90, described with regard to FIGS. 3-6, which is specifically designed to not carry chain tension, it is desirable for all the alternative embodiments of the retainer link 90 described with regard to FIGS. 7-25 to carry chain tension to enhance chain strength. Further it is desirable, for all of the alternative embodiments of the retainer link 90 described with regard to FIGS. 7-25, the bottom 96 of the link 90 to have a small amount of clearance from the bottom of the notch 52 on the strut 50.

The above embodiments of the present invention all relate to retaining links which are located proximate to and, if necessary, are equally spaced from the centerline of the chain-belt but do not specifically dictate how the outer edges of the chain-belt are to be treated. The use of the retaining links of the present invention affects the overall interleaving of the chain links and operates to retain the strut in a lateral orientation with respect to the links. However, the retaining links do not determine how the links are held together. It is intended that the chain designer will provide the necessary press-fit guides, press-fit washers, riveting, clips or other known means to hold the chain lacing together, by design.

Further, it is envisioned that the spirit of the invention can be achieved by incorporating vertically-oriented slots in the struts and designing retaining links intended to engage these vertical slots. Finally, the embodiments discussed herein utilize specific sets and arrangements of interleaved links. These disclosures are not intended to be limiting on the spirit and scope of this invention in that the number, thickness, ratio of link thicknesses, and varieties of link arrangements can be varied to achieve optimum chain-load carrying strength.

The above given embodiments are intended to convey the spirit of the invention but are not intended to limit the scope of the invention as recited in the following claims.

I claim:

1. A power transmission (10) chain-belt (32) for connecting the pulleys (12, 14) of a pulley transmission (10) comprising:
   a plurality of interleaved sets (34) of transversely arranged links (36);
   pivot means (40) joining said interleaved sets (34) of links (36) to form an endless loop;
   a passageway (80) defined by said links (36) in at least some sets (34) of links;
   a plurality of struts (50) engaged with said links (36) and positioned in said passageway (80), each strut (50) having edge surfaces (88) for contacting said pulleys (12, 14) of said transmission (10) and a notch (52), located proximate the centerline of said strut (50), in the upper region of said strut (50); and
   at least one retaining link (90) positioned in each of said sets (34) of links (36) and supported by said pivot means (40), said retaining link (90) being adapted to engage said notch (52) to limit lateral movement of said strut (50) with respect to said links (36).

2. The chain-belt 32 of claim 1, wherein said notch (52) in said strut (50) is slightly wider than the thickness of said retaining link(s) (90) that engage(s) said notch (52), whereby slight lateral movement of said strut (50) can be accommodated to allow said strut (50) to be aligned in said passageway (80) as said chain-belt (32) passes through said pulleys (12, 14).

3. The chain-belt (32) of claim 1, wherein the thickness of said retaining link(s) (90) is generally one-half the width of said notch (52), whereby said strut (50) may move laterally up to one thickness of said retaining link (90).

4. The chain-belt (32) of claim 1, wherein the thickness of said retaining link(s) (90) is generally one-half the thickness of link (36) contained in said sets (34) of links (36).

5. The chain-belt (32) of claim 3, wherein said retaining links (90) are staggered in positioning in said notches (52) between adjacent sets (34) of links (36).

6. The chain-belt (32) of claim 1, wherein said retaining link (90) is bowed from top to bottom or from side to side to provide damping on free strand vibration of the chain-belt (32).

7. The chain-belt (32) of claim 1, wherein said retaining link (90) includes sides (92) which are angled radially outwardly to facilitate articulation of the chain-belt (32), said sides (92) including a curved notch (94) for engaging said pivot means (40), and a bottom (96) which is substantially flat for engaging said notch (52).

8. The chain-belt (32) of claim 1, wherein the bottom (96) of said retaining link (90) is slightly curved to engage said notch (52) and accommodate chain-belt (32) articulation.

9. The chain-belt (32) of claim 1, further including two rows of one-half thickness links (60), wherein said retainer link(s) (90) are flanked by said two rows of one-half thickness links (60).

10. The chain-belt (32) of claim 1, wherein said retaining link (90) includes sides (92) which are angled radially outwardly to facilitate articulation of the chain-belt (32), said sides (92) include a curved notch (94) for engaging said pivot means (40), and a bottom (96) which is slightly curved for engaging said notch (52) and accommodating chain-belt (32) articulation.

11. A power transmission (10) chain-belt (32) for connecting pulleys (12, 14) of a pulley transmission (10) comprising:
    a plurality of interleaved sets (34) of transversely arranged links (36);
    pivot means (40) for joining said interleaved sets (34) of links (36) to form an endless loop;
    at least one toe (42a, 42b) extending from each link (36) in at least some sets (34) of links, at least said toes (42a, 42b) on adjacent links being in opposed relationship and said toes defining a passageway (80);
    a plurality of struts (50) engaged with said links (36) and positioned in said passageway (80), each strut (50) having edge surfaces (88) for contacting said pulleys (12, 14) of said transmission (10) and at least two notches (52) located, proximate the centerline of said strut (50) and in equidistant opposition therefrom, in the upper region (84) of said struts (50); and
    at least one retaining link (90) positioned in each of said sets (34) of links (36) and supported by said pivot means (40), said retaining links (90) being adapted to engage said notches (52) to limit lateral movement of said struts (50) with respect to said links (36).

12. The chain-belt (32) of claim 11, wherein said notches (52) in said strut (50) are slightly wider than the thickness of said retaining link(s) (90) that engage said notches (52), whereby slight lateral movement of said strut (50) can be accommodated to allow said strut (50) to be aligned in said passageway (80) as said chain-belt (32) passes through said pulleys (12, 14).

13. The chain-belt (32) of claim 11, wherein the thickness of said retaining link(s) (90) is generally one-half the width of said notches (52).

14. The chain-belt (32) of claim 11, wherein said retaining link(s) (90) are staggered in positioning in said notches (52), between adjacent sets (34) of links (36).

15. The chain-belt (32) of claim 14, wherein said retaining link(s) (90) are arranged such that in one set (34) of links (36) said retaining link(s) (90) touch the outside edges of said notches (52) and in the adjacent set (34) of links (36) the retaining link(s) (90) touch the inside edges of said notches (52).

16. The chain-belt (32) of claim 14, wherein said retaining link(s) (90) are one-half thickness when compared to the remaining links (36) of said set (34) of links (36).

17. The chain-belt (32) of claim 14, wherein each set (34) of links (36) includes at least one retaining link (90) for engaging said notches (52) in said struts (50) wherein not all notches (52) in any given strut (50) are engaged by said retaining link(s) (90).

18. The chain-belt (32) of claim 10, wherein said retaining link (90) is bowed from top to bottom or from side to side to provide damping on free strand vibration of the chain-belt (32).

19. The chain-belt (32) of claim 11, wherein said retaining link(s) (90) include sides (92) which are angled radially outwardly to facilitate chain-belt (32) articulation, said sides (92) include a curved notch (94) for engaging said pivot means (40), and a bottom (96) which is substantially flat for engaging said notch (52).

20. The chain-belt (32) of claim 11, wherein the bottoms (96) of said retaining links (90) are slightly curved to engage said notches (52) and accommodate chain-belt (32) articulation.

21. The chain-belt (32) of claim 11, wherein said retaining link(s) (90) include sides (92) which are angled radially outwardly to facilitate chain-belt (32) articulation, said sides (92) include a curved notch (94) for engaging said pivot means (40), and a bottom (96) which is slightly curved to engage said notch(es) (52) and accommodate chain-belt (32) articulation.

* * * * *